Aug. 28, 1945.  W. J. COULTAS  2,383,452
MOWER
Filed June 16, 1944   5 Sheets-Sheet 3

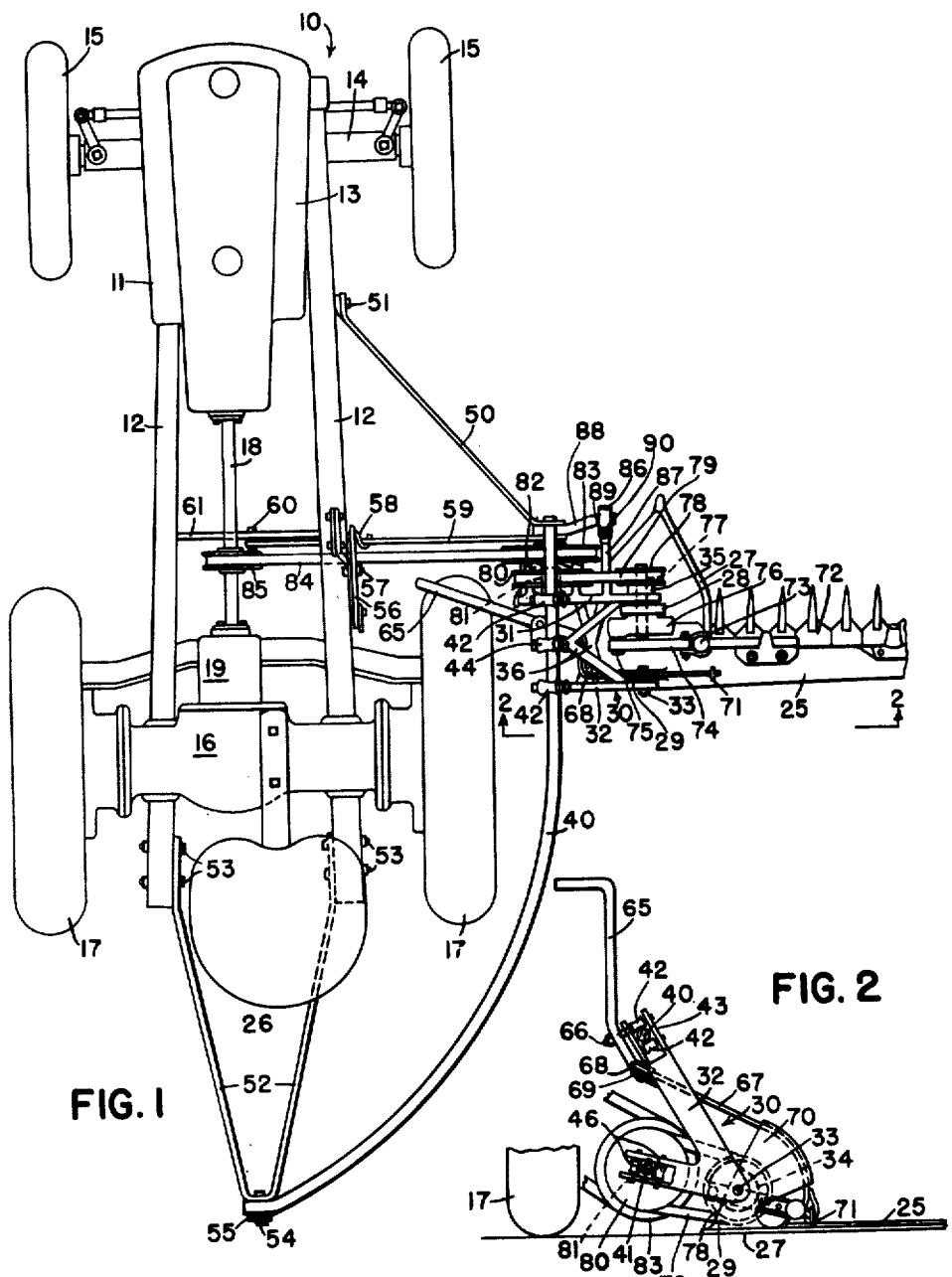

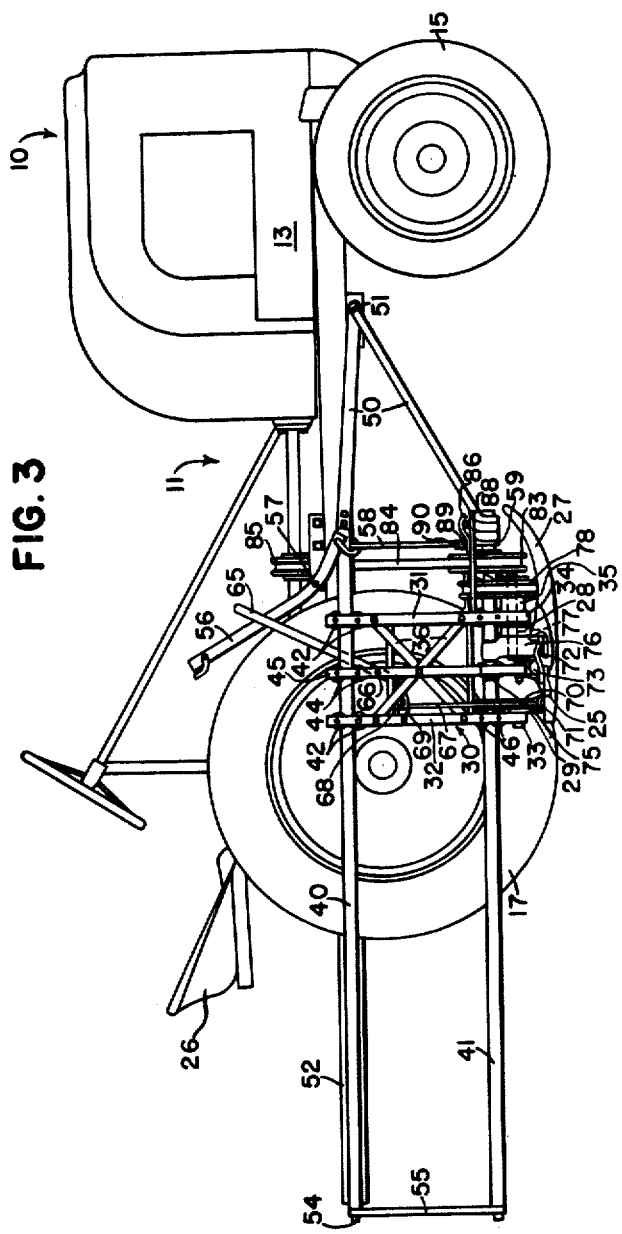

INVENTOR
Wilbur J. Coultas

Aug. 28, 1945. W. J. COULTAS 2,383,452
MOWER
Filed June 16, 1944 5 Sheets-Sheet 4

INVENTOR
Wilbur J. Coultas
BY

Aug. 28, 1945.  W. J. COULTAS  2,383,452
MOWER
Filed June 16, 1944  5 Sheets-Sheet 5

INVENTOR.
WILBUR J. COULTAS

ATTORNEYS

WITNESS

Patented Aug. 28, 1945

2,383,452

UNITED STATES PATENT OFFICE 2,383,452

MOWER

Wilbur J. Coultas, Moline, Ill., assignor to Deere & Company, Moline, Ill., a corporation of Illinois Application June 16, 1944, Serial No. 540,663

32 Claims. (Cl. 56—25)

The present invention relates generally to mowers and more particularly to tractor mounted mowers of the type in which the cutter bar extends laterally from the side of the tractor ahead of one of the rear wheels. This invention is a modification of my invention disclosed in my Patent No. 2,292,362, issued August 11, 1942, and this application is in part, a continuation of my application, Serial No. 437,299, filed April 1, 1942, now forfeited.

For many years, it has been conventional to mount a mower on the side of a tractor in laterally extending position ahead of the rear wheel of the tractor, providing a clear view of the cutter bar from the operator's position on the tractor. It is also conventional to mount such a mower on a vertical pivot, which permits the cutter bar to swing rearwardly about the pivot when the cutter bar encounters an obstruction. In such case, it is necessary to dispose the pivot outside the plane of the tractor wheel, so that when the cutter bar swings rearwardly it does not interfere with the tractor wheel. This arrangement has the disadvantage, however, that when the obstruction engages the cutter bar closely adjacent the inner end of the latter, the leverage applied against the spring actuated latch to release the latter to allow the cutter bar to swing rearwardly, is so small compared with the lever arm available when the obstruction encounters the outer end of the cutter bar, that it is difficult to provide a latch mechanism that would work satisfactorily under all conditions.

This difficulty is not encountered in the case of tractor mounted mowers in which the cutter bar is mounted behind the tractor in laterally extending relation thereto and supported on an arm pivotally connected to the rear of the tractor at the opposite side from the cutter bar. In this type of mower the cutter bar swings rearwardly from the pivot at the opposite side of the tractor and therefore the lever arm acting against the latch mechanism is appreciable, even though the obstruction encounters the inner end of the cutter bar. Furthermore, when the mower shoe encounters an obstruction, damage to the mower is effectively prevented in this type of mower, since the shoe as well as the cutter bar is adapted to swing rearwardly about the pivot, as compared with the side mounted mower in which the vertical pivot extends through the shoe itself and thereby provides no protection to the mower when the obstruction encounters the shoe. Therefore, the principal object of the present invention relates to the provision of a mower in which the cutter bar is mounted on the side of the tractor ahead of the rear wheel and conveniently within the range of vision of the operator of the tractor, but wherein the cutter bar shoe as well as the cutter bar itself is yieldable rearwardly when the latter encounters an obstruction.

Another object of my invention relates to the provision of a tractor mounted mower in which the cutter bar is yieldable rearwardly when the latter strikes an obstruction, with means for maintaining the cutter bar in a transversely disposed position during the first portion of the rearward movement, after which the cutter bar is swung rearwardly to a trailing position.

In my above-mentioned patent, the cutter bar is mounted on supporting means which are pivotally connected at the opposite side of the tractor, the cutter bar and supporting means being disposed ahead of the rear wheels of the tractor. When the cutter bar encounters an obstruction, it swings rearwardly about the pivot at the opposite side of the tractor and provision is made for the wheel of the tractor to pass over the cutter bar. Another object of the present invention has to do with the provision of a support for the cutter bar which permits the latter to move around the outside of one of the wheels of the tractor to a trailing position on the inner side of the plane of the wheel.

Still another object relates to the provision of a cutter bar support which is mounted on a tractor by means permitting a limited amount of rearward shifting movement, and a cutter bar which is pivotally mounted on the cutter bar support and is swingable rearwardly on a vertical pivot to a rearwardly trailing position alongside the tractor wheel. In the accomplishment of this object, two releasable detent mechanisms are provided, one for holding the cutter bar support against rearward movement with respect to the tractor and the other for maintaining the cutter bar in a transverse operating position relative to the support. Another feature of the invention provides for each of the releasable detent means being adapted to yield when the cutter bar encounters an obstruction in the field in order that the inner end of the cutter bar and the shoe itself can yield rearwardly to an obstruction, as well as the outer end of the cutter bar. With this arrangement, if the outer end of the cutter bar encounters an obstruction, the cutter bar detent means is released to permit the cutter bar to swing rearwardly to a trailing position relative to the supporting member, while on the other hand, if the inner end of the cutter bar encounters an obstruction, the cutter bar supporting member is released from the tractor frame and shifts rearwardly bodily, and if further release is required, the cutter bar detent is released to permit the cutter bar to swing about its vertical pivot.

Still another object of the invention relates to the provision of means for disengaging one of the detent means by the increased draft force exerted therethrough when the cutter bar encounters an obstruction, and additional means for releasing the other of the detent means responsive to a rearward yielding movement of the cutter bar after the first detent means has been released. In the preferred embodiment of this feature of invention, the cutter bar supporting member is secured in operating position by a detent that is yieldable to an increased draft force when the cutter bar encounters the obstruction, while the other detent means is disengaged by a pair of camming elements mounted on the tractor and on the cutter bar supporting member, respectively, which are interengageable as soon as the cutter bar supporting member begins to move rearwardly relative to the tractor. Thus, both of the detent means are disengaged substantially simultaneously, whereby the cutter bar support, the shoe, and the cutter bar, all move rearwardly at the same time that the cutter bar is swinging rearwardly to a trailing position. This provides an effective protection for the mower in the event that the shoe strikes an obstruction and also provides a maximum amount of rearward yielding movement of the cutter bar.

These and other objects and advantages of my invention will be apparent to those skilled in the art after a consideration of the following description in which reference is had to the drawings appended hereto, in which Figure v is a plan view of a tractor mounted mower embodying the principles of the present invention;

Figure 2 is a rear elevational view taken in section along a line 2—2 in Figure 1, drawn to an enlarged scale;

Figure 3 is a side elevational view of the tractor and mower mounted thereon;

Figure 4:
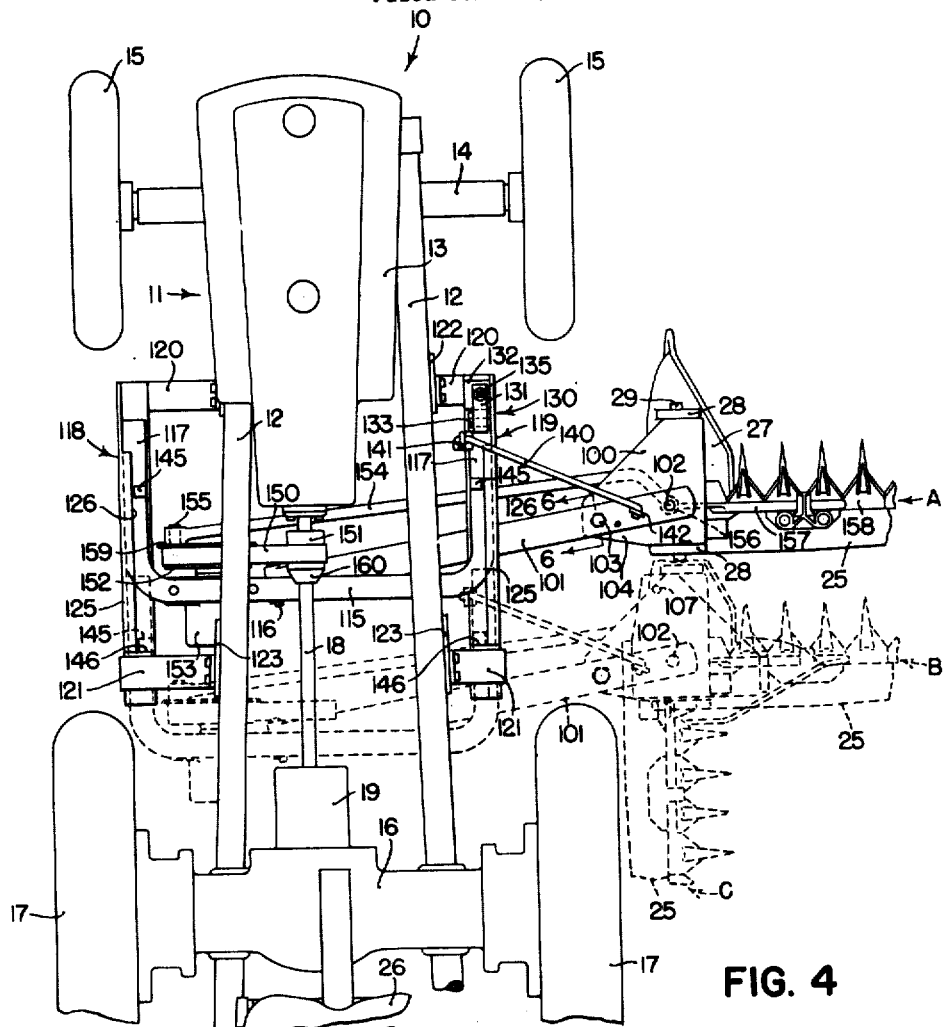
Figure 4 is a plan view of another embodiment of the present invention.
Figure 4A:
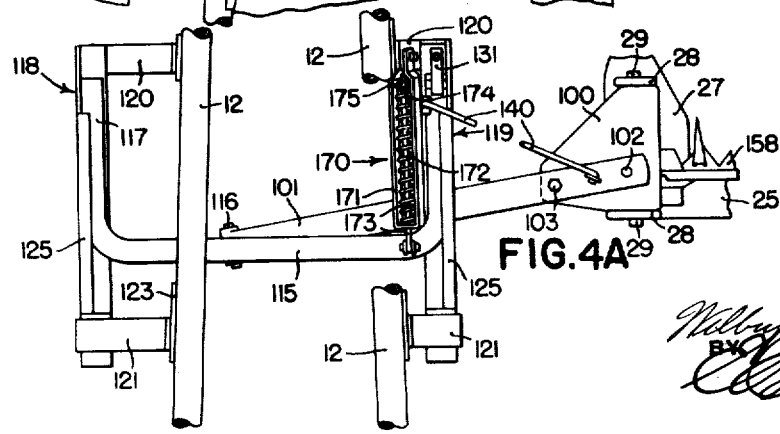
Figure 4a shows an arrangement similar to Figure 4 with the addition of a compression spring between the moving parts.
Figure 5:
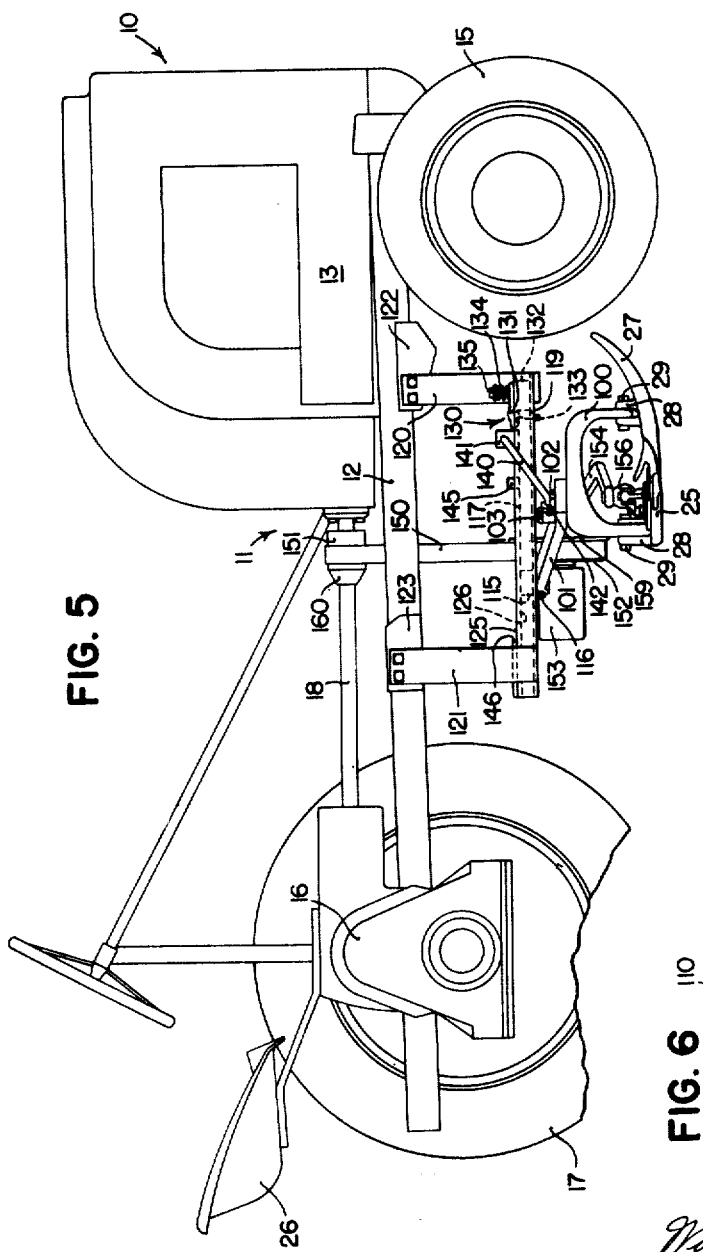
Figure 5 is a side elevational view of the embodiment shown in Figure 4.

Referring now to the drawings and more particularly to Figures 1, 2 and 3, the tractor 10 comprises a longitudinally extending body 11 including a pair of fore and aft extending frame members 12, at the forward ends of which is mounted an engine compartment 13. The forward end of the tractor body is supported on a transverse axle 14, at opposite ends of which are journaled a pair of dirigible front wheels 15. The rear ends of the frame members 12 are carried on a transverse axle housing 16, which is supported at opposite ends thereof on a pair of rear traction wheels 17. The engine drives the tractor wheels 17 through a longitudinally extending power transmitting shaft 18, connected through suitable clutch and gear mechanism within a casing 19 to the wheel driving axles (not shown) within the axle housing 16.

The cutter bar 25 is more or less conventional and is transversely disposed at the side of the tractor ahead of the axis of rotation of the rear wheels and conveniently within the range of vision of the operator when seated on the operator's seat 26. The inner end of the cutter bar 25 is supported on a shoe 27, which is provided with a pair of front and rear supports 28, 29, which are pivotally supported on a truck 30 by means providing for vertical swinging movement in a transverse plane, as will be presently described.

The truck 30 comprises a pair of V-shaped frame members 31, 32 disposed in longitudinally spaced transverse vertical planes at the side of the tractor outside one of the rear traction wheels, with the apex of each of the V-shaped members pointed outwardly. The rear truck frame member 32 is pivotally connected by means of a bolt 33 to the rear support 29 on the mower shoe 27. The front frame member 31 is provided with a bearing portion 34 at its apex, which is journaled on a hub portion 35 of the forward shoe support 28. The axis of the hub portion 35 is substantially in alignment with the axis of the pivot bolt 33, so that the cutter bar 25 and shoe 27 can swing vertically in a transverse vertical plane relative to the truck 30.

The truck 30 also includes diagonal bracing members 36, to provide a rigid truck frame, which is supported on a pair of vertically spaced tracks 40, 41 extending generally horizontally from a point intermediate the front and rear wheels 15, 17 of the tractor 10, outside of the rear tractor wheel 17, and curve inwardly behind the latter and terminate approximately on the center line of the tractor. The upper leg of each of the V-shaped truck frame members 31, 32 is provided with upper and lower rollers 42, journaled in a pair of laterally spaced side members 43 fixed at the upper ends of the truck members 31, 32. A third pair of rollers 44 are journaled in a pair of frame members 45 which are fixed to the bracing members 36 of the truck frame. Similarly, each of the lower legs of the V-shaped truck members 31, 32 is provided with a pair of track rollers 46 disposed on opposite sides of the lower track 41 and journaled in bearings fixed to the lower legs of the members 31, 32. Thus, by virtue of the rollers 42, 44, 46, the truck 30 is supported for traveling movement along the curved tracks 40, 41. The forward ends of the tracks 40, 41 are connected to draft links 50, which extend forwardly and inwardly in converging relation from the ends of the tracks to a pivotal connection at 51 on the side of the tractor frame member 12 adjacent the front wheel 15. The rear ends of the tracks 40, 41 are carried on a pair of converging arms 52, which are rigidly fixed at their forward ends by bolts 53 on the rear ends of the tractor frame members 12. The converging arms 52 are pivotally connected by a bolt 54 to the rear end of the upper track 40, while the lower track 41 is suspended on a hangar 55, also carried on the bolt 54. By virtue of the pivot connections at the forward and rearward ends of the tracks 40, 41, it is evident that there is a limited vertical movement of the tracks relative to the tractor frame. This movement is controlled by a lifting lever 56, mounted on a pivot bolt 57 on the side of the tractor frame and connected by a vertical link 58 to a transverse, generally horizontal lifting arm 59. The lifting arm 59 is pivoted on a bolt 60 at its inner end to a transverse frame member 61, and extends laterally outwardly beneath the tractor frame and ahead of the front wheel 17 and is swingably connected at its outer end adjacent the forward end of the lower track 41. Thus, by swinging the lever 56, the tracks can be raised or lowered to adjust the height of cut.

The cutter bar is also adjustable about the axis of the pivot bolt 33, relative to the truck 30, by means of a manually adjustable lever 65. The lever 65 is pivotally mounted at 66 on the frame of the truck 30. A flexible cable 67 is connected to the lower end of the lever 65 and passes over a pulley 68, which is mounted on a support 69 rigidly fixed to the frame of the truck 30, and passes downwardly and laterally over a grooved sector 70, which is rigidly fixed to the shoe support 29. The outer end of the cable 67 is attached to a suitable eyebolt 71 in the cutter bar 25, spaced outwardly of the supporting pivot 33. When the lever 65 is pulled rearwardly by the tractor operator, the cutter bar 25 is swung upwardly about the pivot bolt 33.

The cutter bar 25 is provided with a sickle 72 adapted to reciprocate thereon, the sickle being connected through a ball and socket joint 73 to a pitman 74, which is journaled on a crank pin 75 on a rotatable flywheel 76. The flywheel 76 is fixed to a shaft 77, which is rotatably supported within the hub 35 of the shoe supporting standard 28. The shaft 77 extends forwardly beyond the hub 35 and on the forward extension thereof is mounted a V-belt pulley 78. The pulley 78 is driven by a V-belt 79, which is trained over a driving pulley 80, journaled on a sleeve 81 which loosely encircles the lower track 41 and is slidable therealong. The sleeve 81 is rigidly fixed to the lower arm of the forward V-shaped truck frame member 31.

The pulley 80 is driven through a clutch 82 by a pulley 83, which is journaled on the lower track member 41, but in longitudinally fixed relation thereto. That is to say, the pulley 83 is not movable rearwardly along the track 41 as is pulley 80, by virtue of its mounting on the sleeve 81. Hence, when the cutter bar and its supporting truck 30 move rearwardly on the tracks, the pulleys 80, 83 are separated at the clutch 82, thereby interrupting the drive between the two pulleys. The pulley 83 is driven by a suitable V-belt 84 from a pulley 85 mounted rigidly on the transmission shaft 18 of the tractor.

The cutter bar and truck 30 are normally secured in operating position at the forward end of the tracks, as shown in the drawings, by means of a latch or spring detent 86, which is mounted on an arm 87, extending forwardly from the forward truck frame member 31. The latch 86 is adapted to releasably engage an arm 88, which is rigidly mounted on the lower track member 41 adjacent the forward end thereof, and extends laterally therefrom. The latch 86 is yieldably held in engagement with the arm 88 by means of a spring 89 which is coiled about a bolt 90 and reacts against the latter to hold the latch 86 downwardly against the arm 88.

Inasmuch as the entire draft force is transmitted to the cutter bar through the latch 86 and arm 87, it is evident that should the cutter bar encounter an obstacle such as a stone or stump, during operation in the field, the increased resistance to forward movement causes the latch 86 to be released from the arm 88 against the action of the spring 89, and the entire cutter bar 25, shoe 27 and truck 30 are permitted to slide rearwardly along the tracks 40, 41 alongside the tractor wheel 17. By virtue of the inward curve to the tracks, the cutter bar swings rearwardly into a trailing position after it passes the rear tread of the tractor wheel 17, whereby the cutter bar is enabled to clear the obstruction in case the operator has not stopped the forward movement of the tractor. The reciprocation of the sickle 72 on the cutter bar 25 is interrupted as soon as the clutch 82 is disconnected, and therefore the sickle remains stationary until the mower is returned to its operating position at the forward end of the track and the clutch 82 is reconnected, as well as the latch 86, whereupon the sickle starts reciprocating once again.

It is to be noted that one of the chief advantages of this type of mower mounting is that the shoe 27 and its supporting structure moves rearwardly as well as the cutter bar. In some prior art structures, the cutter bar is merely pivoted for rearward swinging movement about a vertical axis passing approximately through the shoe 27, and in such type of structure, there is no protection in case the shoe itself or the inner end of the cutter bar encounters the obstruction.

The mower can usually be returned to operating position by maneuvering the tractor rearwardly and to the left, although at times it is necessary for the operator to dismount and swing the mower forwardly by hand. Inasmuch as the cutter bar raising lever 65 is mounted entirely on the truck 30, it moves with the latter, and therefore eliminates the necessity for any provision for disconnecting the lifting mechanism when the mower moves rearwardly.

Referring now to the embodiment shown in Figures 4, 4a, 5 and 6, the cutter bar shoe 27 is pivotally supported by a pair of fore and aft extending pivot bolts 29 to a shoe arch 100. The arch 100 is carried on a supporting arm 101, by means of a vertical pivot bolt 102, which provides for horizontal swinging movement of the cutter bar 25 relative to the supporting arm 101. This relative horizontal swinging movement is normally restrained by means of a releasable spring detent 103, which acts between the supporting arm 101 and a laterally inwardly extending portion 104 of the shoe arch 100.

Figure 6:
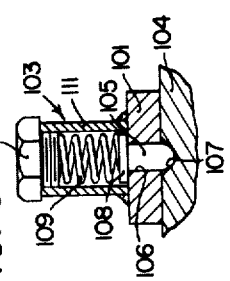
Figure 6 is a sectional elevational view taken along a line 6—6 in Figure 4, and showing, in enlarged scale, the details of one of the spring actuated detents.

The detent 103, as illustrated in Figure 6, comprises a pin 105 extending downwardly through an aperture 106 in the arm 101 and is normally seated in a recess 107 in the portion 104 of the arch 100, the lower end of the detent pin 105 being rounded to permit the same to be forced out of the recess 107 by a lateral pressure against the pin 105. The pin 105 is provided with a head 108, which seats against the top of the arm 101 and limits the extent of the downward movement relative thereto, and is urged toward a seated position by means of a compression coil spring 109, adapted to press downwardly on the head 108. The reaction of the spring 109 is taken against a bolt 110, which is threaded into the upper end of a short nipple 111. The nipple 111 is rigidly fixed, as by welding, to the top side of the arm 101, coaxial with the pin 105, and serves as a protective housing therefor. Thus, it is clear that while the pin 105 seated in the recess 107, normally permits the cutter bar 25 from swinging rearwardly relative to the arm 101, if sufficient force is applied to the cutter bar, such as when an obstruction is encountered during operation, the rounded end of the pin 105, acting against the sloping side of the recess 107, will tend to force the pin 105 upwardly and release the cutter bar arch portion 104 from the arm 101, permitting it to pivot about the axis of the pivot bolt 102.

The inner end of the supporting arm 101 is swingably supported on a U-shaped frame member 115, by means of a generally fore and aft extending pivot bolt 116, providing for vertical swinging movement of the arm 101 and cutter bar 25 in a generally vertical transverse plane, thus providing for floating movement of the cutter bar along the ground during operation. The U-shaped frame member 115 is disposed in a generally horizontal plane substantially centrally located beneath the tractor 10, with the two side legs 117 of the frame 115 extending forwardly at opposite sides of the tractor body 11. The frame member 115 serves as a supporting truck, which is slidably supported on a track frame 118, which comprises a pair of laterally spaced longitudinally extending track members 119, each of which is suspended from the associated tractor frame member 12 by means of fore and aft spaced supporting brackets 120, 121, which are bolted to a pair of securing plates 122, 123, respectively, the latter being welded to the frame members 12.

Each of the track members 119 comprises a structural angle member having one flange disposed horizontally and the other flange extending upwardly from the outer edge thereof. These outer vertical flanges 125 serve as guides to hold the forwardly extending arms 117 of the frame member 115 in a fore and aft position, and permits the frame 115 to slide longitudinally along the track frame 118.

A pair of retaining bars 126 are rigidly fixed to the vertical flanges 125 of the tracks 119 above the truck arms 117 to hold the latter down on the tracks.

The truck member 115 is normally secured adjacent the forward end of the track frame 118 by means of a releasable spring detent 130 comprising a latch arm 131 carried on a block 132, the latter being supported at the forward end of the track 119 on the side adjacent the cutter bar 25. The rear end of the latch member 131 overlies the arm 117 of the truck frame 115 and engages a latch lug 133, which is rigidly fixed to the top of the arm 117. The latch 131 is yieldably forced downward in latching position by means of a compression coil spring 134 encircling a bolt 135 which extends downwardly through aligned openings in the latch 131 and the block 132. A draft link 140 is swingably connected at its forward end to a lug 141, which is rigidly welded or otherwise fixed to the arm 117 behind the latch lug 133, and the link 140 extends rearwardly and outwardly to a pivot connection with a lug 142, which is welded to the top of the outer end of the arm 101. The link 140 is vertically swingable within the lugs 141, 142 to accommodate vertical swinging movement of the arm 101 as the cutter bar floats along the ground.

During operation, the draft force is applied to the cutter bar through the latch 130, the link 140, the latch 103, and the arch 100, and thus it will be evident that when the cutter bar encounters an obstruction, the excess draft force is applied to both of the releasable detents or latches 103, 130. Preferably, the spring pressures of the springs 109 and 134 are such that the latch 130 yields and releases before the release of the detent 103. This permits the truck frame 115 to slide rearwardly along the tracks 119, the cutter bar being maintained in transverse position until the truck 115 reaches the rear end of the track frame 118, whereupon further rearward movement of the truck frame 115 is interrupted by a pair of stops 145, welded to the arms 117 of the truck member 115, encountering a pair of cooperative stops 146, which are fixed to the rear ends of the tracks 119. Any further movement of the tractor relative to the obstruction causes the detent 103 to be released by the excess force against the detent pin 105, camming the latter upwardly out of the recess 107 and permitting the cutter bar to swing rearwardly to a trailing position along the outer side of the rear tractor wheel 17, as indicated at position C in Figure 4. Thus, it is evident that if the inner end of the cutter bar or even the shoe 27 encounters an obstruction, the yielding and rearward movement resulting from release of the latch 130 prevents or minimizes the damage. If the obstruction is encountered by the outer end of the cutter bar, it is sometimes possible for the latch 103 to be released first, whereupon the cutter bar swings rearwardly about the pivot 102, with the result that the latch 130 does not release if the obstruction is effectively cleared.

The cutter bar can be easily returned to its normal operating position by manually swinging the cutter bar forwardly and pushing the supporting truck 115 to the forward end of the track and thereby reengaging both latches 103, 130. Usually, this can be done by maneuvering the tractor backwards in a manner well-known to those skilled in the art.

Power is transmitted to the cutting mechanism from the power shaft 18 by means of a belt 150, trained over a pulley 151 on the shaft 18 and over the mower flywheel 152, which is supported on a shaft journaled in a bearing housing 153, fixed to the transverse portion of the truck frame 115. A pitman rod 154 is journaled on a crank pin 155 mounted on the flywheel 152 and extends laterally beneath the shaft 18 and track 119 to a conventional ball and socket joint 156, by means of which the pitman 154 is connected to the knife head 157 of the sickle 158. The ball and socket joint 156 is disposed beneath the pivot bolt 102 substantially in vertical alignment therewith, to accommodate rearward swinging movement of the cutter bar about the pivot bolt 102. When the truck 115 moves rearwardly, upon release of the latch 130, the flywheel 152 moves rearwardly therewith relative to the pulley 151 on the shaft 18. The flywheel 152 is provided with a flange 159 on its forward face, which engages the belt 150 to move the latter rearwardly off the pulley 151 and thereby interrupting the drive to the sickle. The pulley 151 is tapered at its rearward end, as indicated at 160, to facilitate restoring the belt to driving position when the mower is restored to its operating position at the forward end of the track.

A compression spring device 170 is provided between the truck 115 and the track frame 118 to cushion the shock when the truck slides rearwardly on the tracks 119. The spring device 170 comprises a U-shaped bracket 171, the open end of which is fixed to the right hand bracket 120. Disposed between the sides of the bracket 171 and abutting the rear bight portion is a compression coil spring 172. A rod 173, threaded at its forward end, extends through the spring and is anchored at its rear end to the rear cross bar of the frame 115. A washer 174 is disposed over the rod 173 and bears against the forward end of the spring 172. It is held in position by a nut 175 threaded on the rod 173. Rearward movement of the frame 115 compresses the spring 172. Such movement is thereby yieldingly resisted. Preferably, the spring 172 is of such size that the latch 103 will always open shortly after or simultaneously with latch 130, so cutter bar 25 will start swinging about pivot 102 soon after or immediately upon striking an obstruction. The spring 172 will offer increasing resistance to rearward movement as the frame 115 moves toward its rearwardmost position, and when fully compressed, serves as a stop to limit such movement. Preferably, I give the spring an initial stress sufficient to be capable of forcing the frame 115 back to its normal locked position when the restraining force is removed, that is, when the tractor is backed away from the obstruction. The spring device 170, is not essential, however, and may be omitted.

Figure 7:
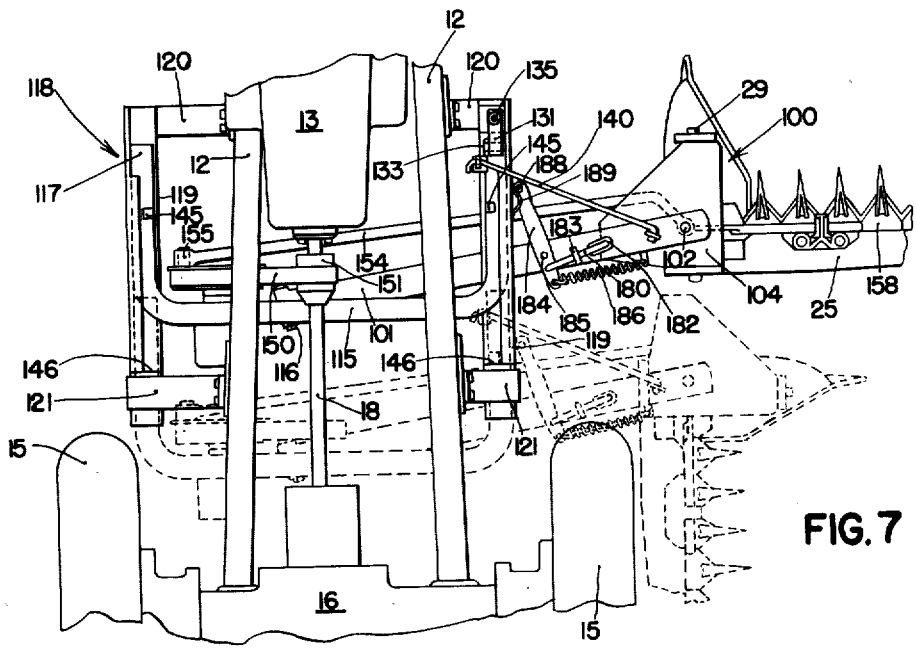
Figure 7 is a fragmentary plan view of a modification of the embodiment of Figures 4 to 6, inclusive.
Figure 8:
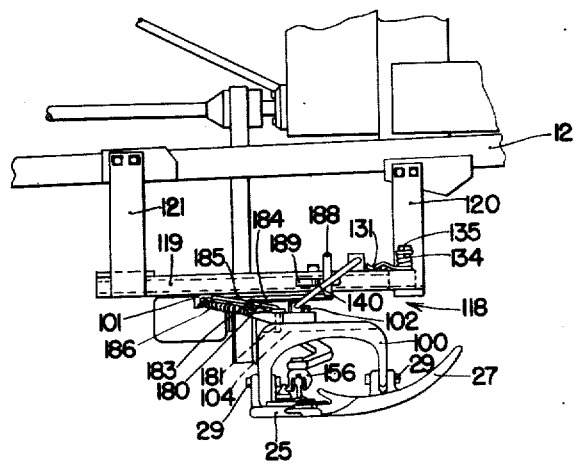
Figure 8 is a fragmentary side elevational view of the embodiment of Figure 7.

In the embodiment of Figures 7 and 8, the spring detent device indicated at 103 in the foregoing embodiment, is replaced by a latch rod 180, which lies along the top of the arm 101 and has a downwardly turned outer end 181 which extends downwardly through a slot 182 in the arm 101 and engages a latching notch in the edge of the portion 104 of the shoe arch 100. The latch rod 180 is shiftable longitudinally along the arm 101 to disengage the latch 181 from the notch in the lateral edge of the laterally extending portion 104, thereby permitting the cutter bar 25 to swing rearwardly about the vertical pivot axis 102. A U-shaped staple bolt 183 holds the latch rod 180 in longitudinally slidable relation to the arm 101. The inner end of the latch rod 180 is pivotally connected to a lever 184 pivotally connected by means of a bolt 185 to the arm 101 and extending forwardly and rearwardly therefrom. The latch rod 180 is connected to the rear end of the lever 184 and a spring 186 is also connected to the rear end of the lever 184 and is stressed in tension to hold the latch rod 180 in engagement with the notch in the shoe arch extension 104. The forward end of the lever 184 is turned upwardly to provide a vertical camming portion 188 which bears against the side of the track member 119. A cam 189 is provided on the side of the track member 119 and is fabricated from a short piece of strap which is bent to form a pair of outwardly converging camming surfaces, and the strap is welded to the side of the track 119 immediately behind the vertical camming portion 188 of the lever 184, in the operating position of the mower.

Thus, it is evident that when the mower cutter bar strikes an obstruction during operation in the field, the latch 131 is disengaged from the U-shaped truck member 115, permitting the latter and the supporting arm 101 and cutter bar 25 to shift rearwardly along the track frame 118. As soon as the cutter bar begins to move rearwardly, the vertical camming portion 188 of the lever 184 rides outwardly on the cam 189, pivoting the lever 184 about the pivot bolt 185 in a clockwise direction as viewed in Figure 7, thereby pulling the latch rod 180 inwardly along the arm 101, disengaging the downwardly turned latch portion 181 from the notch in the shoe arch portion 104, whereupon the cutter bar is free to swing rearwardly about the vertical axis 102 to a rearwardly trailing position alongside the rear tractor wheel 17. Hence, in this embodiment, there is only one latch 131 that needs to be disengaged by an excess draft force exerted by the tractor therethrough when the mower encounters an obstruction, for the other latch which holds the cutter bar against pivotal movement is responsive to the initial rearward shifting movement of the cutter bar supporting member. The combination of rearward shifting movement and rearward swinging movement of the cutter bar provides a maximum protection against obstacles encountered in the field, whether the obstacles engage the outer end or the inner end of the cutter bar. The vertical camming portion 188 is made sufficiently long so that it is engageable with the cam 189 throughout the normal range of floating movement of the cutter bar along the surface of the ground.

I do not intend my invention to be limited to the exact details shown and described herein, except as set forth in the claims which follow.

I claim:

1. A mower comprising a body supported on a pair of laterally spaced wheels, a cutter bar disposed transversely at one side of said body outside the plane of one of said wheels, means for supporting said cutter bar on said body including a frame carried on said body and extending along the outer side of said one wheel longitudinally movable means mounted on said frame, constituting the sole support for said cutter bar and providing for shifting said cutter bar rearwardly around said wheel without interfering with the latter, to a position behind said body and within the plane of said wheel, and means for normally securing said cutter bar in operating position at the side of said body.

2. A mower comprising a body supported on wheels, a cutter bar disposed transversely at one side of said body outside the plane of one of said wheels and ahead of the axis of said wheel, means for supporting said cutter bar on said body including a frame carried on said body and extending from the rear of said body around behind said one wheel and forwardly adjacent the outer side of the latter, a support mounted on said frame and movable longitudinally thereof alongside said wheel, said cutter bar being connected only to said support, thereby providing for shifting said cutter bar rearwardly alongside said wheel without interfering with the latter, to a rearwardly trailing position behind said wheel, and draft means extending between said cutter bar and said body ahead of said wheel, said draft means being releasable to permit said cutter bar to shift rearwardly.

3. A mower comprising a body carried on spaced wheels, a cutter bar disposed transversely at one side of said body outside the plane of one of said wheels, means for supporting said cutter bar on said body including track means supported thereon and extending along the outer side of said wheel, means for movably supporting said cutter bar on said track comprising a truck carried solely on said track and slidable longitudinally thereof, said cutter bar being mounted solely on said truck, thereby providing for rearward movement of said cutter bar therealong without interfering with said wheel, and releasable draft means for normally securing said cutter bar in operating position.

4. A mower comprising a tractor body carried on wheels, a transverse cutter bar, generally longitudinally disposed track means carried on said body, means for movably supporting said cutter bar on said track means comprising a truck carried solely on said track and slidable longitudinally thereof, said cutter bar being mounted solely on said truck, thereby providing for rearward shifting movement of said cutter bar substantially parallel to its normal operating position thereon, and means for releasably securing said cutter bar in said normal operating position.

5. A mower comprising a tractor body carried on wheels, a pair of generally parallel tracks supported longitudinally on said body, a truck movably mounted solely on said tracks, a transversely disposed cutter bar mounted solely on said truck and shiftable rearwardly therewith when said cutter bar encounters an obstruction during operation, and releasable means for securing said cutter bar and truck against rearward movement.

6. A mower comprising a tractor body carried on wheels, generally longitudinally disposed track means carried on said body and extending along the outer side of one of said wheels, a truck movably mounted on said track means and having spaced wheels engaging said track means to prevent said truck from turning about a transverse axis, a transversely disposed cutter bar mounted on said truck and shiftable rearwardly therewith along the outer side of said wheel, when said cutter bar strikes an obstruction during operation, and releasable means for securing said cutter bar against rearward movement.

7. A mower comprising a tractor body carried on front and rear wheels, track means connected to said body ahead of said rear wheels and extending rearwardly outside of one of said rear wheels and curving inwardly behind the latter, a truck engaging said track means and movable therealong, said truck having a plurality of wheels journaled thereon and adapted to engage said track means, said wheels being spaced to prevent said truck from turning vertically or laterally relative to said track means, a cutter bar supported on said truck and extending laterally from the tractor in normal operating position near the forward end of said track means and movable along the latter with said truck to a rearwardly inclined position behind the tractor and releasable means for normally retaining the cutter bar in said operating position.

8. A mower comprising a tractor body carried on front and rear wheels, a pair of vertically spaced tracks connected to said body ahead of said rear wheels and extending rearwardly outside of one of said rear wheels, a truck having upper and lower track followers adapted to move along said track but restraining said truck from vertical and horizontal swinging movement relative to the tracks, a cutter bar mounted on said truck and extending laterally therefrom, and releasable means securing said truck and cutter bar in a normal operating position near the forward end of said track but releasable when the cutter bar encounters an obstruction to permit the cutter bar to move rearwardly.

9. A mower comprising a tractor body carried on wheels, a pair of tracks carried on said body and extending in a generally fore and aft direction, a truck carried on said tracks and movable therealong from an operating position adjacent the forward end thereof, a cutter bar supported on said truck for movement therewith, a sickle movable relative to said cutter bar and mounted thereon, drive means for said sickle carried on said truck, drive means carried on said tracks, a power transmitting connection between said drive means, said connection being separable when said truck moves rearwardly to interrupt the operation of said sickle when the cutter bar encounters an obstruction, power transmitting means connecting the drive means on said tracks with the tractor engine, and means for releasably securing said cutter bar near the forward end of said tracks.

10. A mower comprising a tractor body carried on wheels, a pair of tracks carried on said body and extending in a generally fore and aft direction, a truck carried solely on said tracks and movable therealong from an operating position adjacent the forward end thereof, a cutter bar supported solely on said truck for movement therewith and pivotally mounted thereon for vertical swinging movement relative thereto, and a lifting lever mounted on said truck and movable therewith, said lever being connected to said cutter bar to swing the latter vertically.

11. A mower comprising a tractor body carried on front and rear wheels, a pair of vertically spaced tracks connected to said body ahead of said rear wheels and extending rearwardly outside of one of said rear wheels, a truck having upper and lower track followers adapted to move along said track but restraining said truck from vertical and horizontal swinging movement relative to the tracks, a cutter bar mounted on said truck and extending laterally therefrom, releasable means securing said truck and cutter bar in a normal operating position near the forward end of said track but releasable when the cutter bar encounters an obstruction to permit the cutter bar to move rearwardly, a sickle movably mounted on said cutter bar, a drive element connected therewith and rotatably mounted on said truck, a drive element rotatably supported on said tracks, and a power transmitting connection between said drive means, said connection being separable when said truck moves rearwardly to interrupt the operation of said sickle when the cutter bar encounters an obstruction.

12. A mower comprising a tractor body carried on front and rear wheels, a pair of vertically spaced tracks connected to said body ahead of said rear wheels and extending rearwardly outside of one of said rear wheels, a truck having upper and lower track followers adapted to move along said track but restraining said truck from vertical and horizontal swinging movement relative to the tracks, a cutter bar mounted on said truck and extending laterally therefrom, releasable means securing said truck and cutter bar in a normal operating position near the forward end of said track but releasable when the cutter bar encounters an obstruction to permit the cutter bar to move rearwardly, a sickle movably mounted on said cutter bar, a drive wheel journaled on said truck coaxially of one of said tracks and connected with said sickle, a drive wheel journaled coaxial with said one track separate from said truck, means for driving the last mentioned wheel from the tractor engine, and a separable power transmitting connection between said drive wheels adapted to interrupt the operation of said sickle when the drive wheel associated with the latter moves rearwardly with said truck.

13. A mower comprising a tractor body carried on wheels, a pair of laterally spaced, longitudinally extending tracks supported beneath the tractor body, a truck movably mounted on said tracks and having spaced wheels engaging each of said tracks to prevent swinging of said truck relative to said tracks, a transversely disposed cutter bar mounted on said truck and shiftable rearwardly from a normal operating position when said cutter bar encounters an obstruction during operation, and releasable means for securing said cutter bar and truck against rearward movement.

14. A mower comprising a tractor body carried on wheels, track means extending fore and aft on said body, a truck movable along said track means, a transversely extending cutter bar pivotally mounted on said truck for swinging movement relative to said truck about a vertical pivot, releasable means for securing said cutter bar in fixed transverse position relative to said truck, and releasable means for securing said truck in normal operating position near the forward end of said track.

15. A mower comprising a tractor body carried on wheels, fore and aft extending track means supported beneath said tractor body, a truck movable along said track means, a transversely extending cutter bar pivotally mounted on said truck for swinging movement about a vertical pivot from a transverse operating position to a trailing position along the outer side of one of said tractor wheels, a releasable detent for normally securing said cutter bar in said transverse operating position, a second releasable detent for securing said truck adjacent the forward end of said track, and stop means for arresting the forward movement of said truck on said track means near the rear end of the latter, whereby when said cutter bar encounters an obstruction during operation, said second detent is first released, allowing said truck to be moved against said stop, whereupon a continued rearward pressure against said cutter bar releases said first stop and allows the cutter bar to swing rearwardly on said pivot.

16. A mower comprising a tractor body carried on wheels, a cutter bar supporting member mounted on said tractor body by means providing for a limited amount of rearward movement of said member relative to said tractor, a normally transverse cutter bar supported on said member by means providing for rearward movement of said cutter bar relative to said member, releasable detent means for securing said cutter bar to said member in fixed transverse position relative to said member, and releasable detent means for securing said member in fixed position relative to said tractor, each of said releasable detent means being adapted to yield to a predetermined draft force exerted therethrough to said cutter bar.

17. A mower comprising a tractor body carried on wheels, a cutter bar supporting member mounted on said tractor body by means providing for a limited amount of rearward movement of said member relative to said tractor, a normally transverse cutter bar supported on said member by means providing for rearward movement relative thereto, a spring actuated releasable detent for securing said supporting member in a normal operating position, and a second spring actuated releasable detent for normally securing said cutter bar against rearward movement relative to said supporting member, whereby when said cutter bar encounters an obstruction during operation, said supporting member is moved rearwardly, releasing said detent, and said cutter bar is swung rearwardly relative to said supporting member, thereby releasing said second detent.

18. The combination with a wheel supported vehicle, of a mower having a laterally extending cutter bar, means for movably supporting said mower on said vehicle, a releasable latch for releasably locking said mower in operating position, said latch being releasable to permit movement of said vehicle relative to said mower when said cutter bar strikes an obstruction, and a spring device yieldingly urging said mower forwardly toward operating position.

19. A mower comprising a tractor body carried on wheels, a transverse cutter bar, fore and aft extending track means carried on said tractor body, supporting means for said cutter bar adapted to move longitudinally on said track and to be supported thereby, cutting mechanism operatively associated with said cutter bar, drive means therefor including a drive wheel mounted on said supporting means on a longitudinal axis and movable therewith along said track, a power shaft journaled on said tractor adjacent said drive wheel and having a pulley mounted thereon, belt means normally connecting said wheel and pulley, and releasable means for holding said supporting means in operating position at the forward end of said track means, said holding means being released when the cutter bar encounters an obstruction during operation, thereby moving said supporting means and drive wheel rearwardly to disconnect said belt means and interrupt the driving of said cutting means.

20. The combination with a wheel supported vehicle, of a mower having a laterally extending cutter bar, means for movably supporting said mower on said vehicle providing for rearward translatory movement of said mower from normal operating position, but maintaining said mower parallel to said operating position, and a releasable latch for locking said mower in operating position, said latch being releasable to permit relative movement of said vehicle and said mower when the latter strikes an obstruction.

21. The combination with a wheel supported vehicle, of a mower having a laterally extending cutter bar, means for movably supporting said mower on said vehicle providing for rearward translatory movement of said mower from normal operating position, but maintaining said mower parallel to said operating position, and a releasable latch for locking said mower in operating position, said latch being releasable to permit relative movement of said vehicle and said mower when the latter strikes an obstruction, and spring means for urging said mower toward operating position.

22. A mower comprising a tractor body carried on wheels, a cutter bar supporting member mounted on said tractor body by means providing for rearward movement of said member relative to said tractor, a stop for limiting said rearward movement, a normally transverse cutter bar supported on said member by means providing for rearward movement of said cutter bar relative to said member, releasable detent means for retaining said supporting member in a normal operating position, a second releasable detent means for normally securing said cutter bar against rearward movement relative to said supporting member, and spring means between said supporting member and said tractor body for cushioning the shock when said member moves rearwardly against said limit stop and for urging said member toward its normal operating position.

23. A mower comprising a tractor body carried on wheels, a cutter bar supporting member mounted on said tractor body by means providing for a limited amount of rearward movement of said member relative to said tractor, a normally transverse cutter bar supported on said member by means providing for rearward movement of said cutter bar relative to said member, releasable detent means for securing said cutter bar to said member in fixed transverse position relative to said member, and releasable detent means for securing said member in fixed position relative to said tractor.

24. A mower comprising a tractor body carried on wheels, a cutter bar supporting member mounted on said tractor body by means providing for a limited amount of rearward movement of said member relative to said tractor, a normally transverse cutter bar supported on said member by means providing for rearward movement of said cutter bar relative to said member, releasable detent means for securing said cutter bar to said member in fixed transverse position relative to said member, releasable detent means for securing said member in fixed position relative to said tractor, the last named detent means being adapted to yield to a predetermined draft force exerted therethrough to said cutter bar, and means responsive to rearward yielding movement of said cutter bar supporting member for releasing the first mentioned detent means.

25. A mower comprising a wheel supported frame, a cutter bar supporting member mounted on said frame by means providing for a limited amount of rearward movement of said member relative to said frame, a normally transverse cutter bar supported on said member by means providing for rearward movement of said cutter bar relative to said member, and releasable detent means for normally holding said member and said cutter bar against said rearward movements relative to said frame and to said supporting member, respectively, said holding means being adapted to yield to a predetermined draft force exerted therethrough to said cutter bar, thereby permitting said relative rearward movements.

26. A mower comprising a mobile frame mounted on supporting wheels, a cutter bar supporting member including an arm extending laterally from said frame in front of one of said wheels, means for shiftably supporting said member on said frame providing for movement of said arm from a normal operating position rearwardly toward said one wheel, a cutter bar pivotally mounted on said arm by means providing for rearward swinging movement from a normal transverse operating position to a trailing position alongside said wheel, and releasable means for normally holding said member and said cutter bar against said rearward movements relative to said frame and to said supporting member, respectively, said holding means being adapted to yield to a predetermined draft force exerted therethrough to said cutter bar, thereby permitting said relative rearward movements.

27. A mower comprising a wheel supported frame, a cutter bar supporting member mounted on said frame by means providing for a limited amount of rearward movement of said member relative to said frame, a normally transverse cutter bar supported on said member by means providing for rearward movement of said cutter bar relative to said member, releasable detent means for securing said cutter bar to said supporting member in fixed position relative to said member, releasable detent means for securing said supporting member relative to said frame, one of said detent means being adapted to yield to a predetermined draft force exerted therethrough to said cutter bar, and means responsive to the initial yielding movement of the part secured by said yieldable detent means for releasing the other of said detent means.

28. A mower comprising a mobile frame mounted on supporting wheels, a cutter bar supporting member including an arm extending laterally from said frame in front of one of said wheels, means for shiftably supporting said member on said frame providing for movement of said arm from a normal operating position rearwardly toward said one wheel, a cutter bar pivotally mounted on said arm by means providing for rearward swinging movement from a normal transverse operating position to a trailing position alongside said wheel, releasable detent means for normally holding said supporting member against rearward movement relative to said frame, said detent means being adapted to yield to a predetermined draft force exerted therethrough to permit said supporting member and cutter bar to shift rearwardly relative to said frame, releasable detent means for normally holding said cutter bar in said transversely disposed operating position relative to said supporting member, and means responsive to yielding movement of said supporting member for releasing said cutter bar detent, thereby permitting said cutter bar to swing rearwardly to said trailing position.

29. A mower comprising a wheel supported frame, a cutter bar supporting member mounted on said frame by means providing for a limited amount of rearward movement of said member relative to said frame, a normally transverse cutter bar supported on said member by means providing for rearward movement of said cutter bar relative to said member, releasable detent means for securing said cutter bar to said supporting member in fixed position relative to said member, releasable detent means for securing said supporting member relative to said frame, said detent means for said supporting member being adapted to yield to a predetermined draft force exerted therethrough to said cutter bar, and a pair of camming elements mounted on said frame and said supporting member, respectively, and interengageable by relative movement thereof, to release said cutter bar detent means.

30. A mower comprising a mobile frame mounted on supporting wheels, a cutter bar supporting member including an arm extending laterally from said frame in front of one of said wheels, means for shiftably supporting said member on said frame providing for movement of said arm from a normal operating position rearwardly toward said one wheel, a cutter bar pivotally mounted on said arm by means providing for rearward swinging movement from a normal transverse operating position to a trailing position alongside said wheel, releasable detent means for normally holding said supporting member against rearward movement relative to said frame, said detent means being adapted to yield to a predetermined draft force exerted therethrough to permit said supporting member and cutter bar to shift rearwardly relative to said frame, releasable detent means for normally holding said cutter bar in said transversely disposed operating position relative to said supporting member, and means for releasing cutter bar detent means responsive to the initial rearward yielding movement of said supporting member comprising a pair of camming elements mounted on said frame and said supporting member, respectively, and connected with said cutter bar detent means, said camming elements being interengageable to release the last mentioned detent to permit the cutter bar to swing to said trailing position during rearward movement of said supporting member.

31. A mower comprising a mobile frame mounted on supporting wheels, a cutter bar supporting member including an arm extending laterally from said frame in front of one of said wheels, means for shiftably supporting said arm on said frame providing for vertical swinging movement of said arm and also for movement of said arm from a normal operating position rearwardly toward said one wheel, a cutter bar pivotally mounted on said arm by means providing for rearward swinging movement from a normal transverse operating position to a trailing position alongside said wheel, releasable detent means for normally holding said supporting member against rearward movement relative to said frame, said detent means being adapted to yield to a predetermined draft force exerted therethrough to permit said supporting member and cutter bar to shift rearwardly relative to said fame, releasable detent means for normally holding said cutter bar in said transversely disposed operating position relative to said supporting member, and means for releasing said cutter bar detent means responsive to the initial rearward yielding movement of said supporting member comprising a lever pivotally mounted on said arm and connected at one end with said cutter bar detent means, and a pair of interengageable camming elements mounted on said frame and on said lever, respectively, for actuating said lever responsive to rearward movement of said supporting arm relative to said frame, one of said camming members being elongated vertically to maintain camming contact regardless of vertical swinging movement of said arm.

32. A mower comprising a mobile frame mounted on supporting wheels, a cutter bar supporting member including an arm extending laterally from said frame in front of one of said wheels, means for shiftably supporting said arm on said frame comprising a pair of tracks mounted on said frame and extending fore and aft, a track follower shiftably mounted on said tracks and means connecting said arm to said track follower, providing for movement of said follower and arm from a normal operating position rearwardly toward said one wheel, a cutter bar pivotally mounted on said arm by means providing for rearward swinging movement from a normal transverse position to a trailing position alongside said wheel, releasable detent means interconnecting said track follower and said track for normally holding said follower against rearward movement, said detent means being adapted to yield to a predetermined draft force exerted therethrough to permit said track follower and cutter bar to shift rearwardly, releasable detent means for normally holding said cutter bar in said transversely disposed operating position relative to said arm, and means for releasing said cutter bar detent means responsive to the initial rearward movement of said track follower comprising a lever pivotally mounted on said supporting member and connected at one end with said cutter bar detent means, and a pair of interengageable camming elements mounted on one of said tracks and on said lever, respectively, for actuating said lever responsive to rearward movement of said track follower and said arm.

WILBUR J. COULTAS.

---

CERTIFICATE OF CORRECTION.

Patent No. 2,383,452. August 28, 1945.

WILBUR J. COULTAS.

It is hereby certified that error appears in the printed specification of the above numbered patent requiring correction as follows: Page 2, first column, line 41, for "Figure v" read --Figure 1--; page 7, first column, line 32, claim 15, for "forward" read --rearward--; and that the said Letters Patent should be read with this correction therein that the same may conform to the record of the case in the Patent Office.

Signed and sealed this 27th day of November, A. D. 1945.

Leslie Frazer (Seal) First Assistant Commissioner of Patents.

bar detent means responsive to the initial rearward yielding movement of said supporting member comprising a pair of camming elements mounted on said frame and said supporting member, respectively, and connected with said cutter bar detent means, said camming elements being interengageable to release the last mentioned detent to permit the cutter bar to swing to said trailing position during rearward movement of said supporting member.

31. A mower comprising a mobile frame mounted on supporting wheels, a cutter bar supporting member including an arm extending laterally from said frame in front of one of said wheels, means for shiftably supporting said arm on said frame providing for vertical swinging movement of said arm and also for movement of said arm from a normal operating position rearwardly toward said one wheel, a cutter bar pivotally mounted on said arm by means providing for rearward swinging movement from a normal transverse operating position to a trailing position alongside said wheel, releasable detent means for normally holding said supporting member against rearward movement relative to said frame, said detent means being adapted to yield to a predetermined draft force exerted therethrough to permit said supporting member and cutter bar to shift rearwardly relative to said fame, releasable detent means for normally holding said cutter bar in said transversely disposed operating position relative to said supporting member, and means for releasing said cutter bar detent means responsive to the initial rearward yielding movement of said supporting member comprising a lever pivotally mounted on said arm and connected at one end with said cutter bar detent means, and a pair of interengageable camming elements mounted on said frame and on said lever, respectively, for actuating said lever responsive to rearward movement of said supporting arm relative to said frame, one of said camming members being elongated vertically to maintain camming contact regardless of vertical swinging movement of said arm.

32. A mower comprising a mobile frame mounted on supporting wheels, a cutter bar supporting member including an arm extending laterally from said frame in front of one of said wheels, means for shiftably supporting said arm on said frame comprising a pair of tracks mounted on said frame and extending fore and aft, a track follower shiftably mounted on said tracks and means connecting said arm to said track follower, providing for movement of said follower and arm from a normal operating position rearwardly toward said one wheel, a cutter bar pivotally mounted on said arm by means providing for rearward swinging movement from a normal transverse position to a trailing position alongside said wheel, releasable detent means interconnecting said track follower and said track for normally holding said follower against rearward movement, said detent means being adapted to yield to a predetermined draft force exerted therethrough to permit said track follower and cutter bar to shift rearwardly, releasable detent means for normally holding said cutter bar in said transversely disposed operating position relative to said arm, and means for releasing said cutter bar detent means responsive to the initial rearward movement of said track follower comprising a lever pivotally mounted on said supporting member and connected at one end with said cutter bar detent means, and a pair of interengageable camming elements mounted on one of said tracks and on said lever, respectively, for actuating said lever responsive to rearward movement of said track follower and said arm.

WILBUR J. COULTAS.

---

CERTIFICATE OF CORRECTION.

Patent No. 2,383,452.  August 28, 1945.

WILBUR J. COULTAS.

It is hereby certified that error appears in the printed specification of the above numbered patent requiring correction as follows: Page 2, first column, line 41, for "Figure v" read --Figure 1--; page 7, first column, line 32, claim 15, for "forward" read --rearward--; and that the said Letters Patent should be read with this correction therein that the same may conform to the record of the case in the Patent Office.

Signed and sealed this 27th day of November, A. D. 1945.

Leslie Frazer (Seal)  First Assistant Commissioner of Patents.